United States Patent
Chrabascz et al.

(10) Patent No.: US 10,487,848 B2
(45) Date of Patent: Nov. 26, 2019

(54) FAN INLET DIFFUSER HOUSING FOR AN AIR CYCLE MACHINE SYSTEM

(71) Applicant: Hamilton Sundstrand Corporation, Charlotte, NC (US)

(72) Inventors: Eric Chrabascz, Longmeadow, MA (US); Theodore C. Wright, Montgomery, MA (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 427 days.

(21) Appl. No.: 15/480,601

(22) Filed: Apr. 6, 2017

(65) Prior Publication Data
US 2018/0291925 A1  Oct. 11, 2018

(51) Int. Cl.
| | |
|---|---|
| F04D 29/54 | (2006.01) |
| B64D 13/06 | (2006.01) |
| F04D 19/00 | (2006.01) |
| F04D 27/00 | (2006.01) |
| F04D 29/02 | (2006.01) |
| B64D 13/04 | (2006.01) |

(Continued)

(52) U.S. Cl.
CPC .......... *F04D 29/542* (2013.01); *B64D 13/04* (2013.01); *B64D 13/06* (2013.01); *B64D 13/08* (2013.01); *F04D 19/002* (2013.01); *F04D 27/009* (2013.01); *F04D 29/023* (2013.01); *F04D 29/545* (2013.01); *F25B 9/004* (2013.01); *B64D 2013/0648* (2013.01); *B64D 2013/0662* (2013.01); *B64D 2013/0688* (2013.01); *F05D 2250/51* (2013.01); *F05D 2250/52* (2013.01); *F05D 2260/30* (2013.01); *F05D 2300/603* (2013.01)

(58) Field of Classification Search
CPC combination set(s) only.
See application file for complete search history.

(56) References Cited

U.S. PATENT DOCUMENTS

| | | | |
|---|---|---|---|
| 5,133,194 A * | 7/1992 | Army, Jr. ............... | B64D 13/00 415/117 |
| 6,434,968 B2 | 8/2002 | Buchholz et al. | |

(Continued)

OTHER PUBLICATIONS

EP Application No. 18166069.7 Extended EP Search Report dated Aug. 18, 2016, 8 pages.

*Primary Examiner* — George C Jin
*Assistant Examiner* — Teuta B Holbrook
(74) *Attorney, Agent, or Firm* — Cantor Colburn LLP

(57) ABSTRACT

A fan inlet diffuser housing includes a housing body of composite material and includes a heat exchanger interface portion positioned between an ejector housing portion and a bypass housing portion. A first transition region is formed between the heat exchanger interface portion and the ejector housing portion including an air cycle machine end reinforcement patch proximate to a heat exchanger interface. The air cycle machine end reinforcement patch includes a first patch thickness and a second patch thickness, and a ratio of the first patch thickness to the second patch thickness is between 2.02 and 3.11. An ejector is formed having an ejector gap width between a nozzle portion and a diffuser portion within the ejector housing portion of the housing body. The diffuser portion has a downstream ejector gap width, and a ratio of the downstream ejector gap width to the ejector gap width is between 4.62 and 5.01.

20 Claims, 3 Drawing Sheets

(51) Int. Cl.
*B64D 13/08* (2006.01)
*F25B 9/00* (2006.01)

(56) References Cited

U.S. PATENT DOCUMENTS

| | | |
|---|---|---|
| 8,262,018 B2 | 9/2012 | Scherer et al. |
| 9,228,593 B2 | 1/2016 | Chrabascz et al. |
| 9,302,776 B2 | 4/2016 | Cuthbert |
| 9,347,455 B2 | 5/2016 | Colson et al. |
| 2014/0048229 A1 | 2/2014 | Cuthbert |
| 2014/0050574 A1 | 2/2014 | Chrabascz et al. |
| 2016/0097401 A1* | 4/2016 | Beers .................. F04D 19/00 415/207 |

* cited by examiner

FAN INLET DIFFUSER HOUSING FOR AN AIR CYCLE MACHINE SYSTEM

BACKGROUND

This disclosure relates to fan inlet diffuser housings, and more particularly, fan inlet diffuser housings for air cycle machine systems.

Typically, in modern commercial aircraft, an air cycle machine (ACM) is provided to suitably condition air to be supplied to the cabin or cockpit or other locations for occupant comfort. An air cycle machine system includes a fan inlet diffuser housing to receive the flow of intake air drawn in by the air cycle machine. A flow path of the air cycle machine system can include a heat exchanger cooling flow that draws air through a heat exchanger, past a fan rotor, and dumps the flow into an overboard duct. The fan rotor can be used to establish the flow when insufficient ram air is available to draw air through the heat exchanger. While in service, the heat exchanger can become partially clogged due to dust or other contaminants that reduce available flow volume to the fan rotor, which pushes the fan rotor closer to its surge limit. Designs that attempt to enhance flow as the fan rotor approaches its surge limit may experience a reduction in performance when operating under off-design conditions, which can reduce tolerance to heat exchanger blockage. A unique airflow path shape is needed to meet system performance requirements and to allow efficient fan flow recirculation if the heat exchanger becomes clogged. Further, reducing weight for aerospace applications, while selectively establishing regions of increased structural integrity, can present a number of challenges.

BRIEF DESCRIPTION

In an embodiment, a fan inlet diffuser housing includes a housing body formed from a composite material. The housing body includes a heat exchanger interface portion positioned between an ejector housing portion and a bypass housing portion. The fan inlet diffuser housing also includes a first transition region between the heat exchanger interface portion and the ejector housing portion including an air cycle machine end reinforcement patch proximate to a heat exchanger interface. The air cycle machine end reinforcement patch includes a first patch thickness and a second patch thickness, and a ratio of the first patch thickness to the second patch thickness is between 2.02 and 3.11. The fan inlet diffuser housing also includes an ejector having an ejector gap width between a nozzle portion and a diffuser portion within the ejector housing portion of the housing body. The diffuser portion has a downstream ejector gap width, and a ratio of the downstream ejector gap width to the ejector gap width is between 4.62 and 5.01.

In addition to one or more of the features described above, or as an alternative to any of the foregoing embodiments, further embodiments may include where the housing body further includes a flange at an air cycle machine interface of the ejector housing portion, and the downstream ejector gap width is measured from an outer face of the flange to the diffuser portion.

In addition to one or more of the features described above, or as an alternative to any of the foregoing embodiments, further embodiments may include where the first patch thickness of the air cycle machine end reinforcement patch is positioned between a first offset and a second offset from the outer face of the flange, and a ratio of the first offset to the second offset is between 1.19 and 1.34.

In addition to one or more of the features described above, or as an alternative to any of the foregoing embodiments, further embodiments may include a second transition region between the heat exchanger interface portion and the bypass housing portion including a bypass end reinforcement patch proximate to the heat exchanger interface, and a plurality of spanning ribs each on a separate instance of a housing-side reinforcement patch between the air cycle machine end reinforcement patch and the bypass end reinforcement patch.

In addition to one or more of the features described above, or as an alternative to any of the foregoing embodiments, further embodiments may include where the bypass end reinforcement patch includes the second patch thickness, each instance of the housing-side reinforcement patch includes a third patch thickness, a ratio of the second patch thickness to the third patch thickness is between 1.08 and 1.66, and a ratio of the first patch thickness to the third patch thickness is between 2.70 and 4.16.

In addition to one or more of the features described above, or as an alternative to any of the foregoing embodiments, further embodiments may include where the bypass end reinforcement patch includes a bypass end reinforcement patch width, a housing-side reinforcement patch partial width of an instance of the housing-side reinforcement patch is defined with respect to at least one bolt hole on one of the spanner ribs on the housing-side reinforcement patch, and a ratio of the bypass end reinforcement patch width to the housing-side reinforcement patch partial width is between 0.95 and 1.49.

In addition to one or more of the features described above, or as an alternative to any of the foregoing embodiments, further embodiments may include where the air cycle machine end reinforcement patch, the bypass end reinforcement patch, and each instance of the housing-side reinforcement patch have a common patch height, and a ratio of the housing-side reinforcement patch partial width to the common patch height is between 2.97 and 4.06.

In addition to one or more of the features described above, or as an alternative to any of the foregoing embodiments, further embodiments may include where the nozzle portion comprises an upstream ejector diameter, the diffuser portion comprises a downstream ejector diameter, and a ratio of the downstream ejector diameter to the upstream ejector diameter is between 1.02 and 1.04.

In an embodiment, an air cycle machine system includes an air cycle machine and a fan inlet diffuser housing coupled to the air cycle machine. The fan inlet diffuser housing includes a housing body formed from a composite material. The housing body includes a heat exchanger interface portion positioned between an ejector housing portion and a bypass housing portion. The fan inlet diffuser housing also includes a first transition region between the heat exchanger interface portion and the ejector housing portion including an air cycle machine end reinforcement patch proximate to a heat exchanger interface. The air cycle machine end reinforcement patch includes a first patch thickness and a second patch thickness, and a ratio of the first patch thickness to the second patch thickness is between 2.02 and 3.11. The fan inlet diffuser housing also includes an ejector having an ejector gap width between a nozzle portion and a diffuser portion within the ejector housing portion of the housing body. The diffuser portion has a downstream ejector gap width, and a ratio of the downstream ejector gap width to the ejector gap width is between 4.62 and 5.01.

In an embodiment, a method of installing a fan inlet diffuser housing in an air cycle machine system. The method includes aligning a diffuser cone of a housing body of the fan inlet diffuser housing with a fan rotor of an air cycle machine. The fan inlet diffuser housing includes a housing body formed from a composite material. The housing body includes a heat exchanger interface portion positioned between an ejector housing portion and a bypass housing portion. The fan inlet diffuser housing also includes a first transition region between the heat exchanger interface portion and the ejector housing portion including an air cycle machine end reinforcement patch proximate to a heat exchanger interface. The air cycle machine end reinforcement patch includes a first patch thickness and a second patch thickness, and a ratio of the first patch thickness to the second patch thickness is between 2.02 and 3.11. The fan inlet diffuser housing also includes an ejector having an ejector gap width between a nozzle portion and a diffuser portion of the diffuser cone within the ejector housing portion of the housing body. The diffuser portion has a downstream ejector gap width, and a ratio of the downstream ejector gap width to the ejector gap width is between 4.62 and 5.01. The method also includes coupling the air cycle machine to the ejector housing portion of the fan inlet diffuser housing.

A technical effect of embodiments is achieved by forming and installing a fan inlet diffuser housing as described herein.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
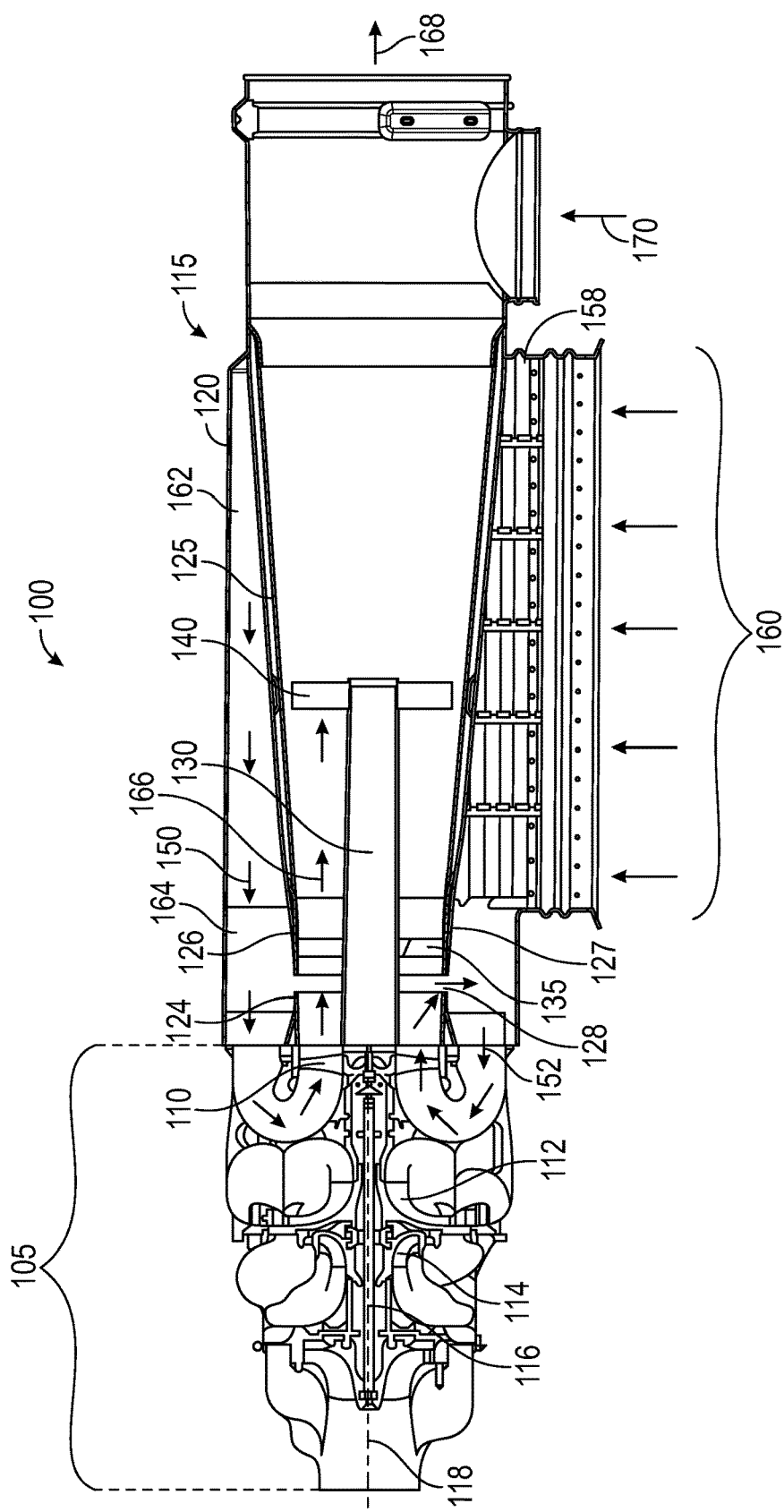
FIG. 1 is a pictorial view of one embodiment of an air cycle machine system including an air cycle machine and a fan inlet diffuser housing in accordance with an embodiment of the disclosure.

Referring to the drawings, FIG. 1 shows an air cycle machine (ACM) system 100. In the illustrated embodiment, the ACM system 100 includes an ACM 105 coupled to a fan inlet diffuser housing 115. The ACM 105 includes a fan rotor 110 coupled to a compressor 112 and a turbine 114 via a shaft 116, which extends along a central axis 118 of the ACM 105. In an embodiment, the fan rotor 110 and the compressor 112 are powered by the turbine 114, which rotatably drives the shaft 116 in response to expansion of compressed air being conditioned as it passes through the ACM 105.

In the illustrated embodiment, the ACM 105 conditions a flow of pressurized air, for example bleed air from the aircraft engine, by not only regulating the pressure of the air to a desired level for cabin pressurization, but also by cooling and dehumidifying the air. The flow of compressed bleed air to be conditioned is passed through the ACM 105 where it is further cooled causing condensation of moisture in the air, thereby dehumidifying the air. The dehumidified air is expanded through the ACM 105 to reduce the pressure to a desired pressure level for delivery to its point of use, (e.g. the aircraft passenger or pilot cabin).

In the illustrated embodiment, the ACM 105 drives the fan rotor (inlet fan) 110 that draws outside air for use with heat exchangers associated with the ACM 105. In the illustrated embodiment, the fan inlet diffuser housing 115 receives airflow 150.

In the illustrated embodiment, the fan inlet diffuser housing 115 includes a housing body 120, a diffuser cone 125 disposed within the housing body 120 and a center tube (center body) 130 disposed within the diffuser cone 125. The center tube 130 is disposed within the diffuser cone 125 via an inboard strut 135 and an outboard inboard strut 140 in the example of FIG. 1. The diffuser cone 125 is axially aligned with the fan rotor 110 on the central axis 118. In the illustrated embodiment, the fan inlet diffuser housing 115 receives the airflow 150, which may be a high-velocity airflow during flight.

A heat exchanger interface 158 can receive an inlet flow 160 from a heat exchanger (not depicted). A diverter vane 162 can divert a portion or all of the inlet flow 160 along an inlet flow path 164, as airflow 150, towards the fan rotor 110. An outlet flow path 166 directs flow past to the fan rotor 110 and towards the diffuser cone 125. An exit flow 168 can route flow from the outlet flow path 166 and/or a heat exchanger bypass flow 170 to dump overboard.

In the example of FIG. 1, the housing body 120 of the fan inlet diffuser housing 115 also includes a nozzle portion 124 and a diffuser portion 126 with an ejector 128 formed as a gap between the nozzle portion 124 and the diffuser portion 126. The diffuser portion 126 is at a fan end 127 of the diffuser cone 125, and the nozzle portion 124 is formed axially between the diffuser portion 126 and the fan rotor 110. The ejector 128 defines a recirculation flow path 152. The recirculation flow path 152 provides flow to the fan rotor 110 in the event that the inlet flow 160 is reduced, for instance, due to clogging of the heat exchanger (not depicted).

Figure 2:
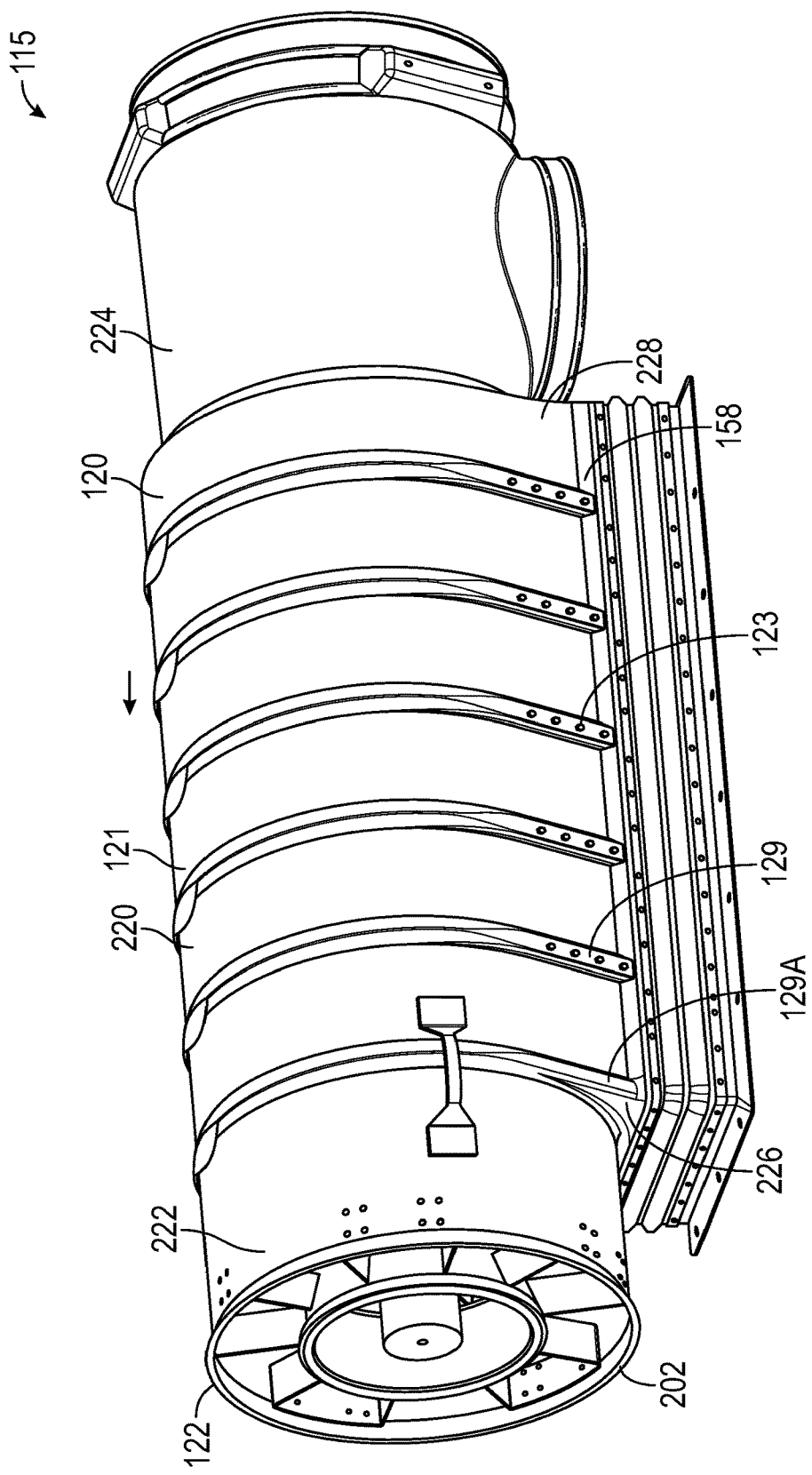
FIG. 2 is a perspective view of the fan inlet diffuser housing of FIG. 1 in accordance with an embodiment of the disclosure.

Referring to FIG. 2, the housing body 120 of the fan inlet diffuser housing 115 is shown. In the illustrated embodiment, the housing body 120 includes an exterior surface 121, a flange 122, and a plurality of spanner ribs 129. In the example of FIG. 2, there are six spanner ribs 129 incorporated in the housing body 120. Five of the spanner ribs 129 each include a plurality of bolt holes 123 which may support attachment with various components.

In the illustrated embodiment, the housing body 120 provides structure to the fan inlet diffuser housing 115. Further, in the illustrated embodiment, the housing body 120 is formed from a composite material with varying thickness. The composite material can be formed from a base glass or fiber material. In certain embodiments, the composite material can be bound by an epoxy, including, but not limited to polyvinyl alcohol. In certain embodiments, the epoxy can be pre-impregnated into a base material.

In the illustrated embodiment, the flange 122 at an ACM interface 202 attaches the fan inlet diffuser housing 115 to the ACM 105 of FIG. 1. In certain embodiments, V-bands are utilized with the flange 122 to attach the fan inlet diffuser housing 115 to the ACM 105.

The housing body 120 is formed of a heat exchanger interface portion 220 positioned between an ejector housing portion 222 and a bypass housing portion 224. A first transition region 226 located between the heat exchanger interface portion 220 and the ejector housing portion 222 can be formed of a thicker number of composite layers as compared to other regions, such as a second transition region 228. The second transition region 228 is located between the heat exchanger interface portion 220 and the bypass housing portion 224. A first spanner rib 129A is located at the first transition region 226, and the second transition region 228 is absent any spanner ribs. The first spanner rib 129A is absent the bolt holes 123, while each of the remaining five spanner ribs 129 includes four bolt holes 123 per side. The spanner ribs 129, 129A span the circumference of the housing body 120 in parallel, starting and ending at opposite sides of the heat exchanger interface 158.

Figure 3:
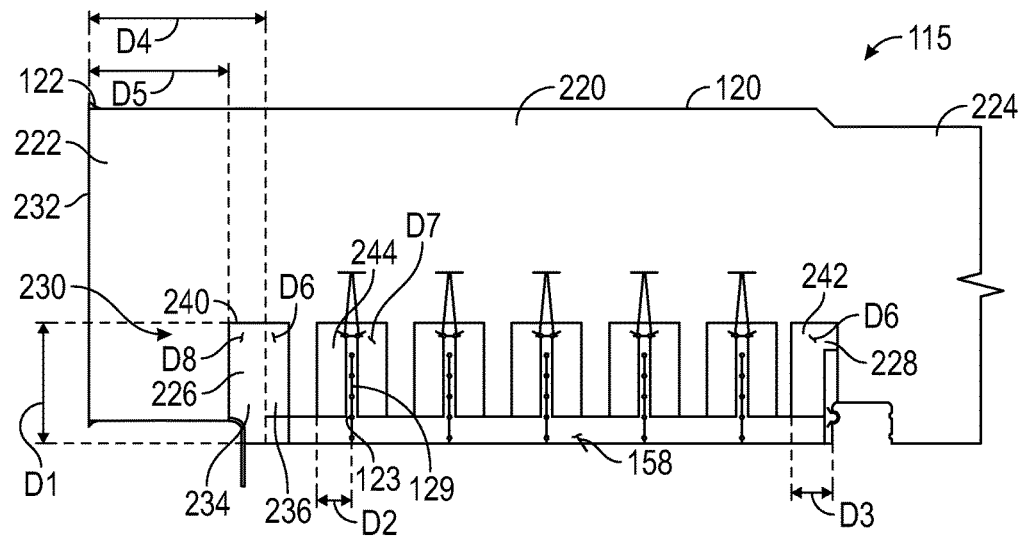
FIG. 3 is depicts an exterior portion of the fan inlet diffuser housing of FIG. 1 in accordance with an embodiment of the disclosure.

FIG. 3 depicts an exterior portion of the fan inlet diffuser housing 115 in greater detail. A base portion 230 of the fan inlet diffuser housing 115 includes varying thickness regions to establish structural integrity while also reducing weight. The first transition region 226 between the heat exchanger interface portion 220 and the ejector housing portion 222 includes an ACM end reinforcement patch 240 proximate to the heat exchanger interface 158. The ACM end reinforcement patch 240 has a first patch thickness D8 and a second patch thickness D6. In embodiments, the first patch thickness D8 is about 0.188 inches (0.48 cm), and the second patch thickness D6 is about 0.075 inches (0.19 cm). The first patch thickness D8 of the ACM end reinforcement patch 240 is positioned between a first offset D4 and a second offset D5 from an outer face 232 of the flange 122. In embodiments, the first offset D4 is about 10.8 inches (27.43 cm), and the second offset D5 is about 8.55 inches (21.72 cm).

The second transition region 228 between the heat exchanger interface portion 220 and the bypass housing portion 224 includes a bypass end reinforcement patch 242 proximate to the heat exchanger interface 158. The bypass end reinforcement patch includes the second patch thickness D6.

Spanning ribs 129 are each on a separate instance of a housing-side reinforcement patch 244 between the ACM end reinforcement patch 240 and the bypass end reinforcement patch 242. In the example of FIG. 3, there are five instances of the housing-side reinforcement patch 244. Each instance of the housing-side reinforcement patch 244 can include a third patch thickness D7. Each bypass end reinforcement patch 244 can include a bypass end reinforcement patch width D3. A housing-side reinforcement patch partial width D2 of an instance of the housing-side reinforcement patch 244 is defined with respect to at least one bolt hole 123 on one of the spanner ribs 129 on the housing-side reinforcement patch 244. In embodiments, the housing-side reinforcement patch partial width D2 is about 2.1 inches (5.33 cm), the bypass end reinforcement patch width D3 is about 2.5 inches (6.35 cm), and the third patch thickness D7 is about 0.056 inches (0.14 cm).

The ACM end reinforcement patch 240, the bypass end reinforcement patch 242, and each instance of the housing-side reinforcement patch 244 can have a common patch height D1. In embodiments, the common patch height D1 is about 7.25 inches (18.42 cm). There are a number of ratios defined for the fan inlet diffuser housing 115 that can selectively enhance structural integrity while reducing weight, withstand environment stress and strain, establish flow paths, as well as address of aspects. In embodiments, a ratio of the first patch thickness D8 to the second patch thickness D6 is between 2.02 and 3.11, and a ratio of the first offset D4 to the second offset D5 is between 1.19 and 1.34. In embodiments, a ratio of the second patch thickness D6 to the third patch thickness D7 is between 1.08 and 1.66, and a ratio of the first patch thickness D8 to the third patch thickness D7 is between 2.70 and 4.16. In embodiments, a ratio of the bypass end reinforcement patch width D3 to the housing-side reinforcement patch partial width D2 is between 0.95 and 1.49, and a ratio of the housing-side reinforcement patch partial width D2 to the common patch height D1 is between 2.97 and 4.06.

Figure 4:
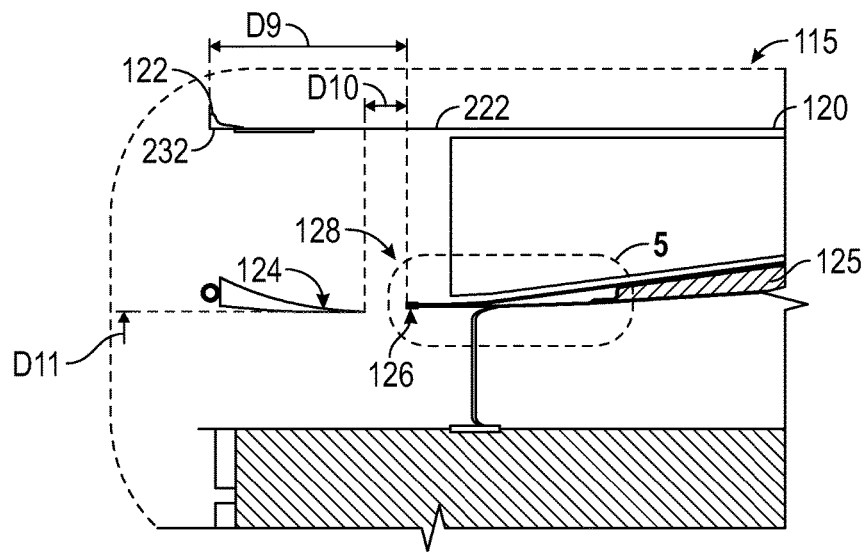
FIG. 4 depicts a partial cross section of the fan inlet diffuser housing of FIG. 1 in accordance with an embodiment of the disclosure.
Figure 5:
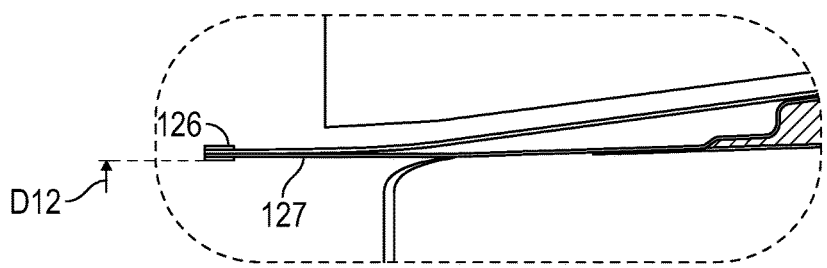
FIG. 5 depicts a region of FIG. 4 in greater detail in accordance with an embodiment of the disclosure.

FIGS. 4 and 5 further illustrate the ejector 128 having an ejector gap width D10 between the nozzle portion 124 and the diffuser portion 126 at the fan end 127 of the diffuser cone 125 within the ejector housing portion 222 of the housing body 120. The diffuser portion 126 has a downstream ejector gap width D9. The nozzle portion 124 has an upstream ejector diameter D11, and the diffuser portion 126 has a downstream ejector diameter D12. In embodiments, the ejector downstream gap width D9 is about 5.05 inches (12.83 cm), and the ejector gap width D10 is about 1.05 inches (2.67 cm). In embodiments, the upstream ejector diameter D11 is about 9.38 inches (23.83 cm), and the downstream ejector diameter D12 is about 9.64 inches (24.49 cm). A number of ratios can be defined for flow control in combination with structural aspects and other aspects. In embodiments, a ratio of the downstream ejector gap width D9 to the ejector gap width D10 is between 4.62 and 5.01, and a ratio of the downstream ejector diameter D12 to the upstream ejector diameter D11 is between 1.02 and 1.04.

A method installing the fan inlet diffuser housing 115 in the ACM system 100 of FIG. 1 includes aligning a diffuser cone 125 of a housing body 120 of the fan inlet diffuser housing 115 with a fan rotor 110 of an ACM 105, and coupling the ACM 105 to the ejector housing portion 222 of the fan inlet diffuser housing 1154. The fan inlet diffuser housing 115 can include the housing body 120 formed from a composite material, where the housing body 120 includes a heat exchanger interface portion 220 positioned between the ejector housing portion 222 and a bypass housing portion 224. A first transition region 226 can be formed between the heat exchanger interface portion 220 and the ejector housing portion 222 including an ACM end reinforcement patch 240 proximate to a heat exchanger interface 158. The ACM end reinforcement patch 240 can have a first patch thickness D8 and a second patch thickness D6. An ejector 128 having an ejector gap width D10 between a nozzle portion 124 and a diffuser portion 126 of the diffuser cone 125 can be formed within the ejector housing portion 222 of the housing body 120, where the diffuser portion 126 has a downstream ejector gap width D9. A flange 122 at an ACM interface 202 of the ejector housing portion 222 can be coupled to the ACM 105, and the diffuser portion 126 can have a downstream ejector gap width D9 measured from the outer face 232 of the flange 122 to the diffuser portion 126.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A fan inlet diffuser housing, comprising:
a housing body formed from a composite material, the housing body comprising a heat exchanger interface portion positioned between an ejector housing portion and a bypass housing portion;
a first transition region between the heat exchanger interface portion and the ejector housing portion comprising an air cycle machine end reinforcement patch proximate to a heat exchanger interface, wherein the air cycle machine end reinforcement patch comprises a first patch thickness and a second patch thickness, and a ratio of the first patch thickness to the second patch thickness is between 2.02 and 3.11; and
an ejector having an ejector gap width between a nozzle portion and a diffuser portion within the ejector housing portion of the housing body, wherein the diffuser portion has a downstream ejector gap width, and a ratio of the downstream ejector gap width to the ejector gap width is between 4.62 and 5.01.

2. The fan inlet diffuser housing of claim 1, wherein the housing body further comprises a flange at an air cycle machine interface of the ejector housing portion, and the downstream ejector gap width is measured from an outer face of the flange to the diffuser portion.

3. The fan inlet diffuser housing of claim 2, wherein the first patch thickness of the air cycle machine end reinforcement patch is positioned between a first offset and a second offset from the outer face of the flange, and a ratio of the first offset to the second offset is between 1.19 and 1.34.

4. The fan inlet diffuser housing of claim 1, further comprising:
a second transition region between the heat exchanger interface portion and the bypass housing portion comprising a bypass end reinforcement patch proximate to the heat exchanger interface; and
a plurality of spanning ribs each on a separate instance of a housing-side reinforcement patch between the air cycle machine end reinforcement patch and the bypass end reinforcement patch.

5. The fan inlet diffuser housing of claim 4, wherein the bypass end reinforcement patch comprises the second patch thickness, each instance of the housing-side reinforcement patch comprises a third patch thickness, a ratio of the second patch thickness to the third patch thickness is between 1.08 and 1.66, and a ratio of the first patch thickness to the third patch thickness is between 2.70 and 4.16.

6. The fan inlet diffuser housing of claim 4, wherein the bypass end reinforcement patch comprises a bypass end reinforcement patch width, a housing-side reinforcement patch partial width of an instance of the housing-side reinforcement patch is defined with respect to at least one bolt hole on one of the spanner ribs on the housing-side reinforcement patch, and a ratio of the bypass end reinforcement patch width to the housing-side reinforcement patch partial width is between 0.95 and 1.49.

7. The fan inlet diffuser housing of claim 6, wherein the air cycle machine end reinforcement patch, the bypass end reinforcement patch, and each instance of the housing-side reinforcement patch have a common patch height, and a ratio of the housing-side reinforcement patch partial width to the common patch height is between 2.97 and 4.06.

8. The fan inlet diffuser housing of claim 1, wherein the nozzle portion comprises an upstream ejector diameter, the diffuser portion comprises a downstream ejector diameter, and a ratio of the downstream ejector diameter to the upstream ejector diameter is between 1.02 and 1.04.

9. An air cycle machine system, comprising:
an air cycle machine; and
a fan inlet diffuser housing coupled to the air cycle machine, the fan inlet diffuser housing comprising:
a housing body formed from a composite material, the housing body comprising a heat exchanger interface portion positioned between an ejector housing portion and a bypass housing portion;
a first transition region between the heat exchanger interface portion and the ejector housing portion comprising an air cycle machine end reinforcement patch proximate to a heat exchanger interface, wherein the air cycle machine end reinforcement patch comprises a first patch thickness and a second patch thickness, and a ratio of the first patch thickness to the second patch thickness is between 2.02 and 3.11; and
an ejector having an ejector gap width between a nozzle portion and a diffuser portion within the ejector housing portion of the housing body, wherein the diffuser portion has a downstream ejector gap width, and a ratio of the downstream ejector gap width to the ejector gap width is between 4.62 and 5.01.

10. The air cycle machine system of claim 9, wherein the housing body further comprises a flange at an air cycle machine interface of the ejector housing portion coupled to the air cycle machine, and the downstream ejector gap width is measured from an outer face of the flange to the diffuser portion.

11. The air cycle machine system of claim 10, wherein the first patch thickness of the air cycle machine end reinforcement patch is positioned between a first offset and a second offset from the outer face of the flange, and a ratio of the first offset to the second offset is between 1.19 and 1.34.

12. The air cycle machine system of claim 11, wherein the fan inlet diffuser housing further comprises:
a second transition region between the heat exchanger interface portion and the bypass housing portion comprising a bypass end reinforcement patch proximate to the heat exchanger interface; and
a plurality of spanning ribs each on a separate instance of a housing-side reinforcement patch between the air cycle machine end reinforcement patch and the bypass end reinforcement patch.

13. The air cycle machine system of claim 12, wherein the bypass end reinforcement patch comprises the second patch thickness, each instance of the housing-side reinforcement patch comprises a third patch thickness, a ratio of the second patch thickness to the third patch thickness is between 1.08 and 1.66, and a ratio of the first patch thickness to the third patch thickness is between 2.70 and 4.16.

14. The air cycle machine system of claim 12, wherein the bypass end reinforcement patch comprises a bypass end reinforcement patch width, a housing-side reinforcement patch partial width of an instance of the housing-side reinforcement patch is defined with respect to at least one bolt hole on one of the spanner ribs on the housing-side reinforcement patch, and a ratio of the bypass end reinforcement patch width to the housing-side reinforcement patch partial width is between 0.95 and 1.49.

15. The air cycle machine system of claim 14, wherein the air cycle machine end reinforcement patch, the bypass end reinforcement patch, and each instance of the housing-side reinforcement patch have a common patch height, and a ratio of the housing-side reinforcement patch partial width to the common patch height is between 2.97 and 4.06.

16. The air cycle machine system of claim 9, wherein the nozzle portion comprises an upstream ejector diameter, the diffuser portion comprises a downstream ejector diameter, and a ratio of the downstream ejector diameter to the upstream ejector diameter is between 1.02 and 1.04.

17. A method for installing a fan inlet diffuser housing in an air cycle machine system, the method comprising:
   aligning a diffuser cone of a housing body of the fan inlet diffuser housing with a fan rotor of an air cycle machine, wherein the fan inlet diffuser housing comprises:
      a housing body formed from a composite material, the housing body comprising a heat exchanger interface portion positioned between an ejector housing portion and a bypass housing portion;
      a first transition region between the heat exchanger interface portion and the ejector housing portion comprising an air cycle machine end reinforcement patch proximate to a heat exchanger interface, wherein the air cycle machine end reinforcement patch comprises a first patch thickness and a second patch thickness, and a ratio of the first patch thickness to the second patch thickness is between 2.02 and 3.11; and
      an ejector having an ejector gap width between a nozzle portion and a diffuser portion of the diffuser cone within the ejector housing portion of the housing body, wherein the diffuser portion has a downstream ejector gap width, and a ratio of the downstream ejector gap width to the ejector gap width is between 4.62 and 5.01; and
   coupling the air cycle machine to the ejector housing portion of the fan inlet diffuser housing.

18. The method of claim 17, wherein the housing body further comprises a flange at an air cycle machine interface of the ejector housing portion coupled to the air cycle machine, and the downstream ejector gap width is measured from an outer face of the flange to the diffuser portion.

19. The method of claim 18, wherein the first patch thickness of the air cycle machine end reinforcement patch is positioned between a first offset and a second offset from the outer face of the flange, and a ratio of the first offset to the second offset is between 1.19 and 1.34.

20. The method of claim 19, wherein the fan inlet diffuser housing further comprises:
   a second transition region between the heat exchanger interface portion and the bypass housing portion comprising a bypass end reinforcement patch proximate to the heat exchanger interface; and
   a plurality of spanning ribs each on a separate instance of a housing-side reinforcement patch between the air cycle machine end reinforcement patch and the bypass end reinforcement patch.

\* \* \* \* \*